J. W. PLACE.
PRESSURE GAUGE.
APPLICATION FILED MAR. 18, 1920.
1,414,154.
Patented Apr. 25, 1922.
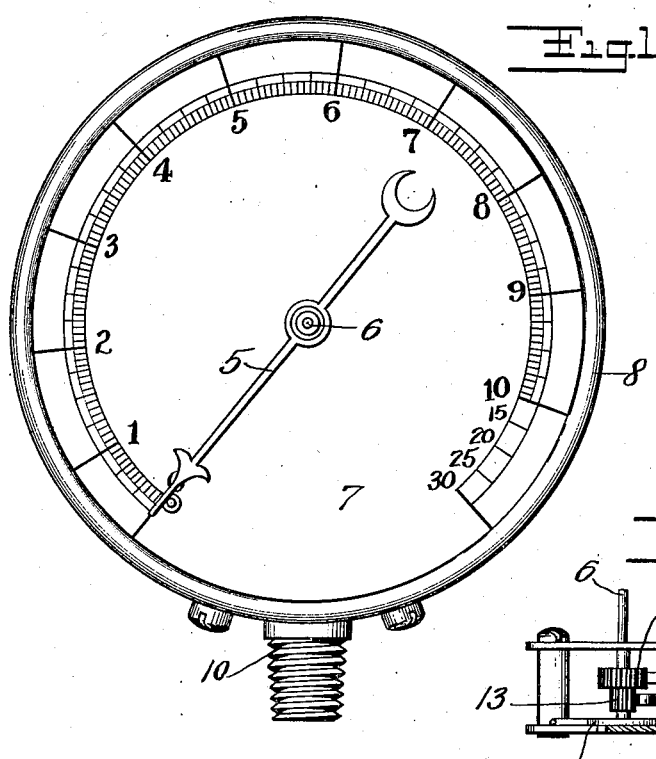
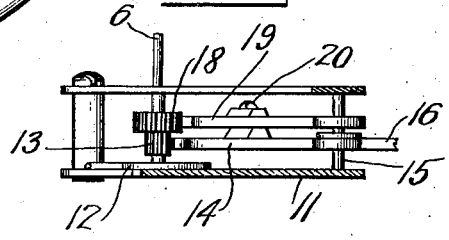
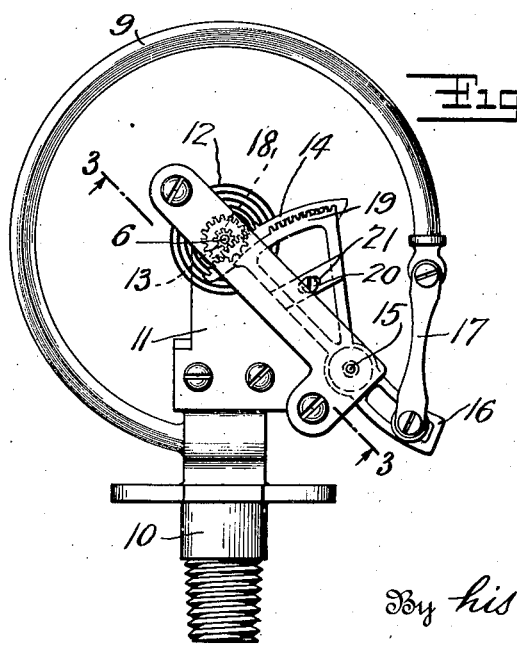
Inventor
J. W. Place
By his Attorneys

UNITED STATES PATENT OFFICE.

JOSIAH W. PLACE, OF ORANGE, NEW JERSEY, ASSIGNOR TO UNITED STATES GAUGE COMPANY, OF NEW YORK, N. Y., A CORPORATION OF PENNSYLVANIA.

PRESSURE GAUGE.

1,414,154.      Specification of Letters Patent.     Patented Apr. 25, 1922.

Application filed March 18, 1920. Serial No. 366,921.

*To all whom it may concern:*

Be it known that I, JOSIAH W. PLACE, a citizen of the United States of America, residing at Orange, New Jersey, have invented a new and useful Pressure Gauge, of which the following is a specification.

My invention relates particularly to a gauge of the so-called Bourdon type and the main object is to provide a simple but reliable mechanism for indicating pressures over a considerable range, the pressures at the lower or what may be termed the normal range being indicated accurately and the pressures above this range being indicated by scale readings which are much closer together and therefore read with less accuracy. By this construction it is possible to cover a very wide range of temperatures on a single gauge.

In its preferred form the invention contemplates the use of a Bourdon tube, a dial, a pointer and a double or graduated gearing connection between the movable end of the tube and the pointer so that the action of the tube may be said to be geared down after the pointer passes over the normal range of pressures.

Fig. 1 is a front view of the construction embodying the improvements of my invention.

Fig. 2 is a front view with the casing removed.

Fig. 3 is a side elevation in partial section on the plane of the line 3—3 of Fig. 2.

The pointer 5 is mounted on a spindle 6 which projects through the dial 7 in the casing 8.

The tube 9 is carried by the base 10 which also carries the frame 11 for the multiplying mechanism. The light spring 12 connects the spindle with the frame in the usual manner. A pinion 13 on the spindle 6 is normally in mesh with a sector 14 on the shaft 15. This sector has a slotted arm 16 connected by link 17 to the movable end of the tube 9. The action of the parts thus far described is the same as in other gauges of this general type while the pointer is traveling over what may be termed the normal range of the scale, for instance, from zero to 10.

To indicate pressures above 10 by a reduced angular movement of the pointer, I provide a gear 18 on the spindle 6 and a sector 19 on the shaft 15, the teeth of which are adapted to be brought into mesh when the pointer 5 reaches the upper limit of the normal scale range, at which time the teeth of the sector 14 pass out of mesh with the teeth of the pinion 13. For convenience in mounting and adjusting, the sector 19 may be secured to the sector 14 by a screw 20 passing through a slotted cross bar 21 in the sector 19 and screwing into the sector 14. In this way it is possible to adjust the sector 19 with relation to the sector 14 so that the teeth will intermesh at the proper points. In this way the multiplication of movement from the end of the tube 9 to the pointer 5 may be varied by the use of the proper proportionate sizes of gears and sectors and without the use of any additional spring devices. It will also be seen that the action of the mechanism is wholly independent of any variation in the relation between the tube and the casing. It is, therefore, possible to initially adjust the mechanism before mounting the parts in the casing.

I claim:

1. In a Bourdon gauge construction, a tube, an indicator, a spindle therefor, two pinions of different diameters on said spindle and both movable therewith, two sectors of different radii adapted to intermesh successively with said pinions respectively, and means for connecting said sectors with a movable portion of the tube.

2. In a gauge construction, an expansible member, an indicator, two gearing connections of different ratios between said expansible member and said indicator, whereby one of said gearing connections will move the indicator over one portion of its full range at one rate, and the other of said gearing connections will move said indicator over another portion of its full range at a different rate.

JOSIAH W. PLACE.